United States Patent [19] [11] 4,264,662
Taylor et al. [45] Apr. 28, 1981

[54] ADHESIVE PRODUCTS HAVING POLYMER-TREATED EMBRITTLED ZONES

[75] Inventors: Benjamin J. Taylor, Crawcrook; Robert M. Lacy, Cramlington, both of England

[73] Assignee: Avery International Corporation, San Marino, Calif.

[21] Appl. No.: 947,811

[22] Filed: Oct. 2, 1978

[30] Foreign Application Priority Data

Oct. 6, 1977 [GB] United Kingdom ............... 41584/77

[51] Int. Cl.$^3$ .......................... B65D 65/28; B05D 5/00
[52] U.S. Cl. ......................................... 428/40; 428/41; 428/43; 428/195; 428/211; 427/261; 427/286; 427/288; 427/395; 427/372.2; 206/620
[58] Field of Search ..................... 428/41, 43, 40, 248, 428/211, 195; 206/447, 460, 629, 633, 411, 390, 620; 427/270, 288, 265, 275, 307, 308, 264, 261, 286, 372 R

[56] References Cited

U.S. PATENT DOCUMENTS

| 2,100,385 | 11/1937 | Dreyfus ................................ 427/308 |
| 2,373,954 | 4/1945 | Frankfurther .................... 427/288 X |
| 3,006,793 | 10/1961 | Wheeler ................................ 428/41 |
| 3,035,957 | 5/1962 | Morgan ................................ 428/41 |
| 3,677,460 | 7/1972 | Whitman ......................... 427/288 X |

OTHER PUBLICATIONS

Translation of Japanese Pat. Apln. 11392-71, pp. 1-6, "Process for Making Adhesive Products Having Embrittled Zones".

Primary Examiner—Marion Mc Camish
Assistant Examiner—Alexander S. Thomas
Attorney, Agent, or Firm—Christie, Parker & Hale

[57] ABSTRACT

Adhesive products such as label stock, labels, tapes, and the like having a facestock, an adhesive layer and a removable, fibrous backing are described. The backing is provided with integral embrittled zones which crack when the adhesive product is flexed and offer gripping points for removal of the backing. The embrittled zones contain brittle, film-forming organic polymer suffused among the fibers. The presence of the polymer in the embrittled zone helps to enhance the brittleness of the zones and to reduce the transfer of residual chemical embrittling agent from embrittled zones of the backing to portions of the facestock brought into contact therewith when the adhesive product is stacked or rolled. Embrittled zones are preferably formed by applying a thickened acidic solution comprising a polymer emulsion to the backing of the adhesive product and then curing and drying the solution by heating.

9 Claims, No Drawings

ADHESIVE PRODUCTS HAVING POLYMER-TREATED EMBRITTLED ZONES

BACKGROUND OF THE INVENTION

1. Field of the Invention

The present invention relates to adhesive products such as label stock, labels, tapes, and the like and more particularly to adhesive products having protective backings provided with embrittled zones that aid in removing the backing from the adhesive.

2. Description of the Prior Art

Many adhesive products, particularly those having pressure sensitive adhesives, are provided with a backing which is secured to the surface of the adhesive and which protects the adhesive before use. It is known to provide embrittled zones in the form of thin lines running across the backing of such adhesive products. When the adhesive product is sharply flexed along an embrittled line, the backing cracks along the line and the newly-formed edges of the backing lift up off of the adhesive layer, thereby offering gripping points for peeling the backing from the adhesive. Embrittled zones that are not sharply flexed have sufficient tensile strength to permit removal in one continuous piece of a portion of backing having one or more of such embrittled zones. Thus, when two or more embrittled zones are present in the backing of a label, one of the zones can be cracked selectively and the backing can be removed in only two pieces. Until the flexing operation occurs, however, the adhesive surface is protected and contained by the backing. The embrittled zones are integral with the backing and serve to protect and contain the adhesive until cracked.

U.S. Pat. No. 3,035,957, incorporated herein by this reference, describes one such adhesive product having a fibrous backing with embrittled zones. The embrittled zones are produced by applying heat, a flame, a chemical substance such as sulfuric acid, ultraviolet radiation, or the like to partially degrade or decompose a portion of the fibrous backing. U.S. Pat. No. 3,006,793, incorporated herein by this reference, describes adhesive products in which embrittled zones extend diagonally across the backing from edge to edge. In one embodiment, the embrittled zones are produced by applying a chemical embrittling agent such as an aqueous solution of sulfuric acid with the use of a printing roll having raised helical printing ridges.

Japanese Patent Application No. 1971-11392, which was filed on Mar. 5, 1971, and laid open to public inspection on Nov. 14, 1972, and is incorporated herein by this reference, describes forming the embrittled zones by applying lines of viscous, aqueous solution of hydrochloric acid with the use of an applicator roller having helical grooves which receive the acid solution from a dip bath and transfer the solution to the backing. The applied lines of solution are dried and cured at temperatures of 300° to 400° F. The viscous solution comprises up to about 13 weight percent hydrogen chloride, sufficient organic thickener to provide a viscosity of 2,000 to 3,000 centripoises, and minor amounts, up to about 2 percent, of wetting agent and anti-foam agent.

When an acidic solution is used to form the embrittled zones, a problem is encountered. Residual acid remains in the backing after the drying and curing operation even when a volatile acid, such as hydrochloric acid, is used. When label stock having these acid embrittled zones is rolled or stacked for transfer to a label printer, for example, the backing of one layer of label stock comes into contact with the face of another layer of label stock. Residual acid is transferred from embrittled zones of the backing to the face of the adjacent label stock and changes the printing characteristics of the face. When ink is subsequently applied to the label face in a printing operation, the portions of the label affected by the residual acid take on a color or intensity of color different from that of the surrounding regions. The effect is typically seen as a line of lighter or contrasting color running across the face of the printed label. The degree of this effect depends upon the chemical nature of the ink used. Some inks are so sensitive to the acid-caused changes that they cannot be used with the acid-embrittled adhesive products of the prior art.

Another problem encountered in the manufacture of the prior art products is the need to balance carefully the degree of brittleness and the tensile strength of the embrittled zones to provide a balance between good cracking performance upon flexing and avoidance of unwanted cracking.

SUMMARY OF THE INVENTION

It has now been found that presence of a brittle, film-forming organic polymer suffused into the embrittled zones, that is, between and among the fibers of the zones and not merely on the surface of the zones, enhances the brittleness, the crackability of the embrittled zones, and retards the transfer from embrittled zones of an adhesive product backing to a surface of any residual chemical embrittling agent in contact therewith, e.g., from the backing of one sheet of label stock to the face of another in a stack.

The brittle, film-forming organic polymers useful herein are sufficiently brittle for the backing to crack cleanly along the embrittled zones without any bridging.

The invention provides an adhesive laminate comprising a facestock, an adhesive layer on the facestock, and a removable fibrous backing in contact with the adhesive layer, the backing having at least one narrow embrittled zone, integrally included in the backing and the embrittled zone comprising an organic, brittle film-forming polymer. When the embrittled zone comprises residual chemical embrittling agent, the brittle, film-forming polymer is effective to retard the transfer of residual chemical embrittling agent from an embrittled zone to a surface in contact with the embrittled zone.

In the practice of a preferred embodiment of this invention, such adhesive products are made by (1) applying to a portion of a removable fibrous backing of the laminate, an aqueous embrittling solution comprising a chemical embrittling agent and a brittle, film-forming organic polymer resistant to the chemical embrittling agent, and (2) curing and drying the applied solution to form an embrittled zone comprising an amount of said polymer effective to retard transfer of residual chemical embrittling agent from the embrittled zone to a surface in contact therewith. In a more preferred embodiment, the chemical embrittling agent is hydrochloric acid and the polymer is acid resistant.

The invention also provides a process for the production of an adhesive laminate comprising a facestock, an adhesive layer on the facestock, and a removable fibrous backing, with the fibrous backing having at least one embrittled zone, which process comprises: (1) applying to a portion of the fibrous backing an aqueous embrittling solution containing 1 to 15 weight percent hydrogen chloride, 0.5 to 3 weight percent organic thickener, and 1 to 10 weight percent organic, brittle film-forming polymer in emulsion form; and (2) curing and drying the applied solution at 150° to 250° C. to form an embrittled zone comprising said polymer.

The invention also provides a process for the production of an adhesive laminate comprising a facestock, an adhesive layer on the facestock, and a removable fibrous backing in contact with the adhesive layer in which at least one integral embrittled zone is formed in the backing, and an organic, brittle film-forming polymer is introduced into the embrittled zone.

The invention also provides an aqueous solution for providing embrittled zones on a removable fibrous backing of an adhesive laminate comprising also a facestock, and an adhesive layer on the facestock, the fibrous backing being in contact with the adhesive layer, which solution comprises (1) from 1 to 15 weight percent of a volatile chemical embrittling agent capable of embrittling zones of the backing when the solution is applied to the backing and is dried by heating; and (2) an organic, brittle film-forming polymer that remains in the embrittled zones after the solution is dried.

The invention also provides an aqueous solution for providing embrittled zones on a removable fibrous backing of an adhesive laminate comprising also a facestock, and an adhesive layer on the facestock, the fibrous backing being in contact with the adhesive layer, which solution comprises from 1 to 15 weight percent of hydrogen chloride, from 0.5 to 3 weight percent of an organic thickener, from 0.4 to 1 weight percent of wetting agent, from 0.5 to 2 weight percent of anti-foam agent, and from 1 to 10 weight percent of organic, brittle film-forming polymer; the solution being such that when applied to zones of the backing and dried by heating, embrittled zones are formed on the backing, and the polymer penetrates the backing and retards the transfer of residual hydrochloric acid from the embrittled zones.

DETAILED DESCRIPTION OF THE INVENTION

The adhesive products of the present invention are laminated structures comprising a facestock, an adhesive layer on the facestock, and a removable fibrous backing in contact with the adhesive layer which protects the adhesive layer before the product is used. Any conventional facestock such as paper, plastic, cloth, and the like may be used. Similarly, any conventional adhesive, such as natural and synthetic rubber based adhesives, acrylics, and polyurethanes, may be used. When elevated curing and drying temperatures are encountered in the practice of this invention, the facestock and adhesive are chosen from materials that can withstand such temperatures. The backing comprises a fibrous material having integral zones that are embrittled by application of heat, a flame, a chemical substance, or radiation such as ultra-violet radiation so that the embrittled zones crack upon flexing but retain sufficient tensile strength to maintain the integrity of the backing during ordinary handling, such as removal of the backing from a label. Useful backing materials include paper, cloth, and the like. A fibrous backing of paper or a similar cellulosic material is preferred. The side of the backing that contacts the adhesive is typically coated with a release agent such as a silicone to prevent the adhesive from sticking to the removable backing.

The adhesive laminate is first assembled by any convenient technique, many of which are known to those skilled in the art. Conveniently, a web of facestock is continuously coated with adhesive and then laminated to the release-coated side of a continuous web of backing; alternatively, the adhesive coating is applied to the backing web prior to lamination rather than to the facestock. Then, either in separate operations or in a combined operation, narrow embrittled zones are formed in the backing and an organic, brittle film-forming polymer is suffused into the embrittled zones. Preferably, substantially all of the polymer in the backing is within the embrittled zones.

The embrittled zones may be formed by the application of heat, for example, by contacting the backing with a flame or hot wire or stylus; by directing an intense beam of radiation such as infrared radiation, visible light, or ultraviolet radiation, at the backing; or by applying a chemical embrittling agent, for example, a solution of a strong organic or mineral acid such as acetic acid, sulfuric acid or hydrochloric acid. The use of an aqueous solution of hydrochloric acid is preferred because, as described below, the polymer can be incorporated in the acid solution so that the embrittled zones are formed and the polymer is suffused into the zones in a single operation.

The polymer can be introduced into the embrittled zones in a variety of ways. When the embrittled zones are formed by the application of intense heat or radiation, it is desirable to introduce the polymer after the embrittled zones are formed so as to avoid degradation of the polymer by heat or radiation. The polymer can be applied to the embrittled zones by a printing process, as a hot melt, or dissolved in an organic solvent, or preferably emulsified in water. The adhesive product with applied polymer is then passed through a heating zone where the polymer penetrates into the backing within the boundaries of the embrittled zones and where solvent or water is removed.

The fibrous backings used in the adhesive products include a minor amount, typically less than about 10 volume percent, of void volume between and among the fibers of the backing. The polymer is suffused into the backing so as to occupy at least a portion of the void volumes within the boundaries of the embrittled zones, rather than merely lying on the surface. It is indeed preferred to avoid a raised line of polymer protruding above the surface of the backing, because such a raised line can interfere with stacking and printing operations.

The entire backing can be suffused with polymer to assure that the embrittled zones are included, but the cost of materials may render this approach uneconomical.

In a preferred embodiment of this invention, an embrittling solution comprising both a chemical embrittling agent and a polymer is used to form the embrittled zones and to incorporate the polymer into the zones in one operation. Particularly preferred is an aqueous embrittling solution comprising a volatile acid, notably hydrochloric acid, and a polymer in emulsion form.

In the practice of this preferred embodiment, the assembled laminate is first dried. In particular, the laminate is dried to a moisture content below about 3 weight percent, e.g. between about 0.5 and 2 weight percent to avoid delamination in the subsequent steps. An aqueous, embrittling solution comprising hydrochloric acid and a polymer emulsion is applied to portions of the backing of the dried laminate and the laminate is heated to dry the embrittling solution and form the embrittled zones. The laminate is then passed through a humidification chamber to raise the moisture content of the laminate to prevent curling.

The preferred chemical embrittling solution is an aqueous solution containing a volatile acid, notably hydrochloric acid, and an acid resistant polymer in emulsion form. To improve the handling properties of the solution, an organic thickening agent and minor amounts of a wetting agent and an anti-foam agent are usually added. The solution contains from 1 to 15 weight percent, preferably from about 2 to about 5 percent acid. The lower concentrations are preferred in order to minimize problems of acid transfer. The polymer is present in the solution in amounts of from about 1 to about 10 percent by weight of solution, preferably from about 5 to about 7 percent by weight of solution. Sufficient organic thickening agent is added to provide a solution having a desired viscosity that depends upon the method of application used. Between about 0.5 and about 3 weight percent of thickener is added, preferably between about 1 and about 2 weight percent. Minor amounts of antifoam agent and wetting agent are used. The anti-foam agent is included in amounts of between about 0.5 and about 2.0 percent, preferably about 1 percent. The wetting agent is included in amounts of between about 0.4 and about 1 percent, preferably about 0.5 percent. The thickener, wetting agent and anti-foam agents are added so that the solution can be applied in a controlled manner in the form of narrow zones or lines, preferably between about 0.2 and 2 millimeters wide, on the backing of the laminate. Consequently, the relative proportions of these ingredients can be varied to provide optimum results with the particular method of application being employed.

During the heating of the laminate to form the embrittled zones, not only the liquid content of the solution evaporates, but also there is a loss of the more volatile solids. Preferably the dry solids remaining in the embrittled zones after the heating are less than 8 percent by weight of the original solution. Higher residual solids in the embrittled zones can leave a raised line of solids above the surface of paper backing. The proportion of polymer solids in the total solids of the embrittling solution should be kept as high as possible to more fully realize the advantages of the present invention.

The embrittling solution is normally prepared in a two stage operation. First, the required water, thickening agent, anti-foam agent, wetting agent, and polymer emulsion are combined as a master batch having a higher viscosity than is desired for the working solution. The master batch has a reasonable shelf life for storage. When a new batch of working solution is called for, the required amount of hydrochloric acid is added slowly with agitation. This reduces the viscosity to the desired level, for example, about 2,000 to 3,000 centipoises. The solution when so prepared has a normal service life of at least about four hours. If desired, the polymer can be added to the solution in the second stage of mixing. The acid is added to the solution shortly before use because it gradually hydrolyzes the organic thickener, causing the viscosity of the solution to eventually drop below a useful level.

A wide variety of polymers can be used. Exemplary polymers include plasticized and unplasticized polyvinyl chlorides, polyvinyl alcohols, polyvinyl acetates, styrene acrylate copolymers, and thermoplastic and self cross-linking acrylic polymers. Acrylic polymers tend to be acid sensitive. Polyvinyl acetate polymers are preferred. The polymers are typically added to the embrittling solution in the form of an aqueous emulsion. Useful emulsions are sufficiently acid stable so that the polymer remains in emulsion in the embrittling solution for the normal service life of the solution, for example, at least about four hours.

The polymers form films that are brittle at normal ambient temperatures, e.g., 15° to 30° C. The brittleness of the polymer film enhances the brittleness (the crackability) of embrittled zones containing the polymer. When the embrittled zones are formed chemically, for example with acid, the polymers are resistant to the embrittling agent; that is, the polymers are chemically stable in the presence of residual chemical embrittling agent in the embrittled zones and retard the transfer of residual embrittling agent to a surface in contact with the embrittled zones.

It is believed, without intending to be bound by the theory, that the polymers form a film or coating on the fibers of the backing in the embrittled zone to trap residual embrittling agent, e.g., acid that is present in the fibers, thereby retarding the transfer of the residual acid out of the backing to another surface. The polymers are capable of forming a film at temperatures up to about 250° C. The polymers do not exhibit any tackiness after drying or in the presence of high humidity.

Any organic thickening agent that is sufficiently acid-stable to provide a solution having a working life of at least about four hours can be used in the embrittling solution of this invention. Examples of thickening agents include vegetable gums, such as xantham gum and gum arabic, ethylene oxide polymers, and various cellulose derivatives such as methylcellulose, hydroxypropyl methylcellulose, hydroxybutyl methylcellulose, hydroxyethyl cellulose, and the like. Hydroxypropyl methylcellulose is preferred and is normally present in an amount of 1 to 2 weight percent, preferably between about 1.2 and 1.4 weight percent. When hydroxypropyl methylcellulose is used as a thickener, a minor amount of ammonia, less than about 0.05 weight percent, can be added to the solution in order to help dissolve the thickener.

Examples of wetting agents include anionic sulphosuccinates, alkylarylpolyether alcohols such as isooctyl phenoxy polyethoxy ethanol, ethoxylated nomyl phenol, and naphthalene sulphonates, and conventional anti-foam agents such as silicone anti-foam agents.

To establish the embrittled zone, the laminate is passed as a web preferably under tension in contact with a suitable applicator which applies the embrittling solution. Preferably the applicator is a roller having helical grooves. The grooves receive the solution from a dip bath with excess solution being wiped away from the surface of the roller by a doctor blade in firm contact with the surface of the applicator. Upon contact with the backing of the laminate, the grooves release the embrittling solution to the paper backing.

The pattern produced is a series of parallel lines which traverse the web at some angle to its direction of travel. Spacing between the zones will vary depending upon the size of the label to be cut from the stock and is adjusted to assure that each label cut will have at least one embrittled zone on its backing. Following application of the embrittling solution the web is passed through a curing zone which is maintained at a temperature from about 150° to about 250° C. preferably from about 180° to about 200° C. Upon heating, the zones are cured, the lines of embrittlement are established, and the polymer present in the embrittling solution forms a protective film on the fibers of the backing. The web is maintained at the curing temperature for a time between about 0.5 and about 5 minutes, preferably from about 1 to 2 minutes.

The minimum film-forming temperature of the polymers is, for example, not greater than 50° C.; but since, as described above, during curing a temperature of up to 250° C. may be achieved, polymers having minimum film-forming temperatures well in excess of 50° C. can be feasible.

After the embrittled zones are cured, the web is passed through a moisturizing zone. Generally in such a zone the moisture content of the paper is allowed to increase to a level of between about 2 and 10 percent and preferably to about 3 to 5 percent by weight of paper. The moisturizing is conveniently accomplished by passing the web through a chamber maintained at a relative himidity of 90 percent, such as with steam. The resultant moisturized label stock will lie flat for subsequent printing and cutting operations.

Although this invention has been described in terms of particular detail and embodiments thereof, the particulars are not intended to limit the invention, the scope of which is defined by the following claims.

What is claimed is:

1. An adhesive laminate comprising a facestock, an adhesive layer on the facestock, and a removable fibrous paper backing in contact with the adhesive layer, the paper backing having at least one narrow embrittled zone integrally included in the paper backing comprising an organic, brittle film-forming polymer within the fibrous paper backing said film-forming polymer being selected from the group consisting of polyvinyl chloride, polyvinyl alcohol, polyvinyl acetate, polystyrene acrylate, and thermoplastic and self-cross-linking acrylic polymers.

2. An adhesive laminate according to claim 1 wherein the embrittled zone comprises residual chemical embrittling agent and the polymer retards transfer of residual chemical embrittling agent from the embrittled zone.

3. An adhesive laminate according to claim 2 wherein the backing is paper, the residual embrittling agent comprises hydrogen chloride, and the polymer is a poly(vinyl acetate).

4. An adhesive laminate according to claim 1 or claim 2 wherein the polymer enhances the brittleness of the embrittled zone.

5. An adhesive laminate according to claim 1 wherein substantially all of the polymer present is within the embrittled zone.

6. A process for the production for an adhesive laminate comprising a facestock, an adhesive layer on the facestock, and a removable fibrous paper backing, with the fibrous paper backing having at least one embrittled zone, the process comprising the steps of:
    a. applying to a portion of the fibrous paper backing an aqueous embrittling solution containing 1 to 15 weight percent hydrogen chloride, 0.5 to 3 weight percent organic thickener, and 1 to 10 weight percent organic, brittle film-forming polymer in emulsion form, said film-forming polymer being selected from the group consisting of polyvinyl chloride, polyvinyl alcohol, polyvinyl acetate, polystyrene acrylate, and thermoplastic and self-cross-linking acrylic polymers and
    b. curing and drying the applied solution at 150° to 250° C. to form an embrittled zone comprising said polymer integrated within the paper backing.

7. A process for the production of an adhesive laminate comprising a facestock, an adhesive layer on the facestock, and a removable fibrous paper backing in contact with the adhesive layer in which at least one integral embrittled zone is formed in the paper backing, comprising introducing into the embrittled zone an organic, brittle film-forming polymer selected from the group consisting of polyvinyl chloride, polyvinyl alcohol, polyvinyl acetate, polystyrene acrylate, and thermoplastic and self-cross-linking acrylic polymers.

8. A process according to claim 7 wherein the polymer is introduced by applying a solution of polymer in solvent to the embrittled zone and removing the solvent.

9. A process according to claim 7 wherein the polymer is introduced by applying an aqueous emulsion of the polymer to the embrittled zone and drying the applied emulsion.

* * * * *